(12) United States Patent
Pedersen et al.

(10) Patent No.: US 9,797,378 B2
(45) Date of Patent: Oct. 24, 2017

(54) DIRECT-DRIVE WIND TURBINE

(75) Inventors: Bo Pedersen, Lemvig (DK); Kim Thomsen, Ikast (DK)

(73) Assignee: SIEMENS AKTIENGESELLSCHAFT (DE)

(*) Notice: Subject to any disclaimer, the term of this patent is extended or adjusted under 35 U.S.C. 154(b) by 819 days.

(21) Appl. No.: 14/122,119

(22) PCT Filed: Aug. 10, 2012

(86) PCT No.: PCT/EP2012/065673
§ 371 (c)(1),
(2), (4) Date: Jan. 27, 2014

(87) PCT Pub. No.: WO2013/034389
PCT Pub. Date: Mar. 14, 2013

(65) Prior Publication Data
US 2014/0169952 A1 Jun. 19, 2014

(30) Foreign Application Priority Data

Sep. 8, 2011 (EP) .................................... 11180622

(51) Int. Cl.
| | | |
|---|---|---|
| F03D 9/00 | (2016.01) | |
| F16H 57/021 | (2012.01) | |
| F16C 19/36 | (2006.01) | |
| F16H 57/08 | (2006.01) | |
| F16C 19/38 | (2006.01) | |
| F16H 1/28 | (2006.01) | |
| F16C 17/10 | (2006.01) | |
| F16C 17/03 | (2006.01) | |
| F16C 17/06 | (2006.01) | |
| F03D 80/70 | (2016.01) | |
| F03D 15/00 | (2016.01) | |
| F03D 9/25 | (2016.01) | |

(52) U.S. Cl.
CPC ............... *F03D 9/002* (2013.01); *F03D 9/25* (2016.05); *F03D 15/00* (2016.05); *F03D 80/70* (2016.05);
(Continued)

(58) Field of Classification Search
CPC ... Y02E 10/722; Y02E 10/725; Y02E 10/721; Y02E 10/726; F03D 80/70; F03D 15/00;
(Continued)

(56) References Cited

U.S. PATENT DOCUMENTS

| 3,982,796 A | 9/1976 | Hill |
| 2002/0049108 A1 | 4/2002 | Hoesle |

(Continued)

FOREIGN PATENT DOCUMENTS

| DE | 2409711 C2 | 8/1983 |
| DE | 10255745 A1 | 6/2004 |

(Continued)

OTHER PUBLICATIONS

Chinese Office Action dated Oct. 10, 2015; Application No. 201280043763.3; Siemens Aktiengesellschaft; 15 pgs.

(Continued)

*Primary Examiner* — Mark Laurenzi
*Assistant Examiner* — Wesley Harris
(74) *Attorney, Agent, or Firm* — Schmeiser Olsen & Watts LLP

(57) ABSTRACT

A direct driven wind turbine and a main bearing used in such a wind turbine is provided. A rotor of the wind turbine is directly connected with a rotating drive train of the wind turbine, the rotating drive train is directly connected with a rotor of an electrical generator of the wind turbine. The rotating drive train is connected with a stationary part of the wind turbine via at least one bearing, which allows the rotation of the drive train in relation to the stationary part. The at least one bearing is a plain bearing and the bearing is a tapered bearing, which comprises at least one conical shaped sliding surface.

11 Claims, 4 Drawing Sheets

Figure 1:
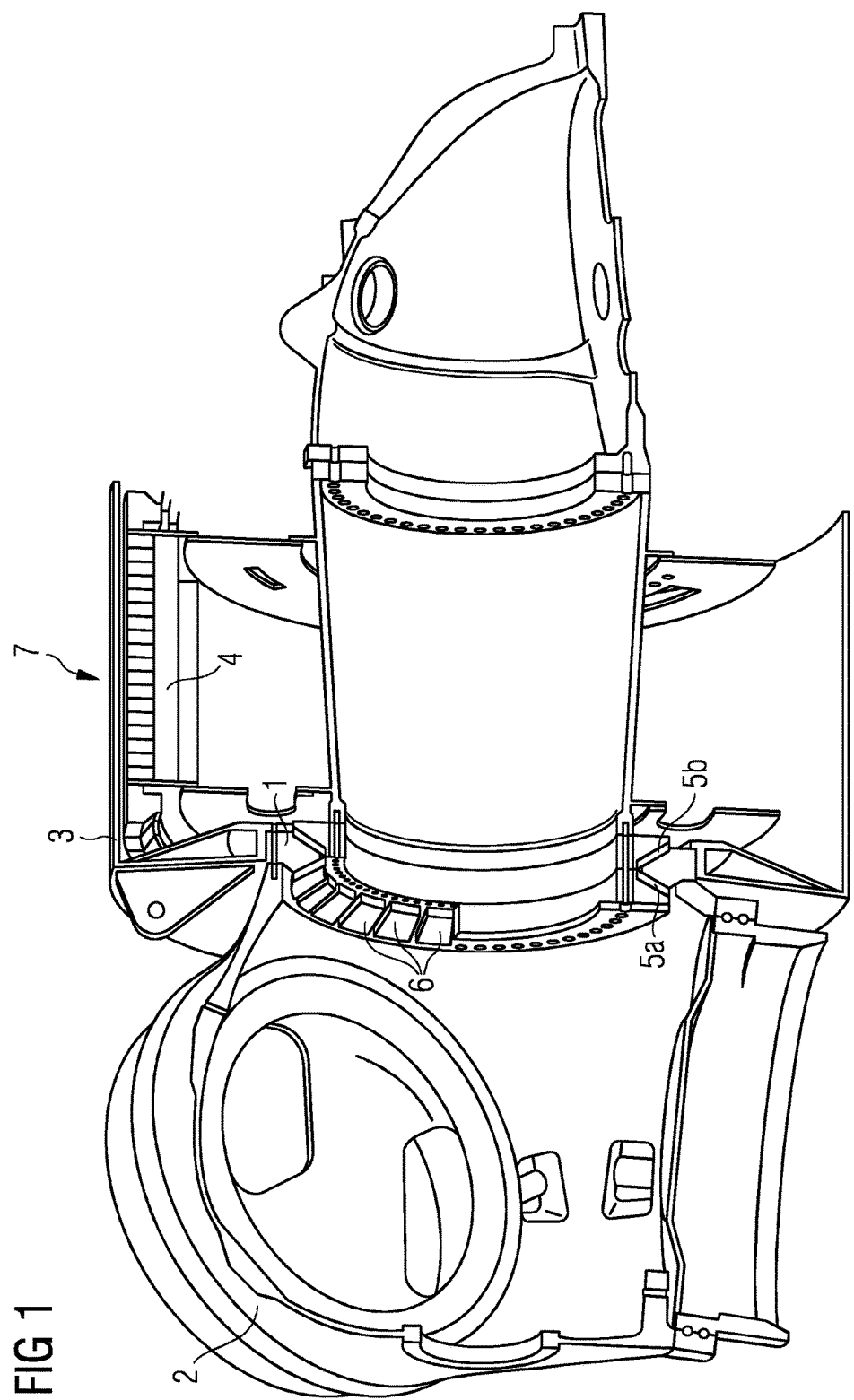

(52) U.S. Cl.
CPC .............. *F16C 17/03* (2013.01); *F16C 17/06* (2013.01); *F16C 17/10* (2013.01); *F16C 19/364* (2013.01); *F16C 19/386* (2013.01); *F16H 1/2836* (2013.01); *F16H 57/021* (2013.01); *F16H 57/082* (2013.01); *F05B 2220/7066* (2013.01); *F05B 2240/50* (2013.01); *F05B 2260/40311* (2013.01); *F16C 2300/14* (2013.01); *F16C 2360/31* (2013.01); *F16C 2361/61* (2013.01); *Y02E 10/721* (2013.01); *Y02E 10/722* (2013.01); *Y02E 10/725* (2013.01); *Y02E 10/726* (2013.01)

(58) Field of Classification Search
CPC .. F03D 9/002; F16C 2360/31; F16C 2300/14; F16C 19/386; F16C 2361/61; F16C 19/364; F05B 2260/40311; F05B 2220/7066; F05B 2240/50; F16H 57/082; F16H 1/2836; F16H 57/021
See application file for complete search history.

(56) References Cited

U.S. PATENT DOCUMENTS

| | | | |
|---|---|---|---|
| 2003/0039419 A1 | 2/2003 | Wobben | |
| 2010/0066096 A1* | 3/2010 | Stiesdal | F03D 9/002 290/55 |
| 2011/0001320 A1* | 1/2011 | Lagerweij | F03D 9/002 290/55 |

FOREIGN PATENT DOCUMENTS

| | | |
|---|---|---|
| EP | 1184567 A2 | 3/2002 |
| WO | 2011003482 A2 | 1/2011 |
| WO | WO 2011127510 A1 | 10/2011 |

OTHER PUBLICATIONS

Presentation "Wind Energy—Overview—Potential, Competences & Experience"; Oct. 2010; pp. 1-8; 2010.
Email of Mr. Kari dated Nov. 29, 2010; 2010.
Presentation "Wind Energy—Plain Bearings in Main Bearing Applications"; Sep. 2010; pp. 1-13; 2010.
PCT/EP2012/065673 International Search Report and Written Opinion, dated Aug. 21, 2013. Siemens Aktiengesellschaft (10 pages).
EP11180622.0 European Search Report, dated Feb. 6, 2012. Siemens Aktiengesellschaft (6 pages).
PCT/EP2012/065673 International Search Report and Written Opinion, dated Aug. 21, 2013. Applicant's or Agent's File Ref: 2011P14650WO. 10 pages.
Presentation "Wind Energy—Overview—Potential, Competences & Experience"; Oct. 2010; pp. 1-8.
Email from Mr. Kari dated Nov. 29, 2010.
Presentation "Wind Energy—Plain Bearings in Main Bearing Applications"; Sep. 2010; p. 1-13.
Summons to attend oral proceedings pursuant to Rule 115(1) EPC—Application No. 12748188.5; 8 pgs.

* cited by examiner

DIRECT-DRIVE WIND TURBINE

FIELD OF TECHNOLOGY

The following relates to a direct driven wind turbine and the main bearing used in such a wind turbine.

BACKGROUND

A wind turbine transfers the energy of moving air into electrical energy. The moving air accelerates the rotor of the wind turbine. The rotation of the rotor is transferred to an electrical generator. The electrical generator transforms the rotational energy into electrical energy. In the last years the concept of a direct driven wind turbine was established. In a direct driven wind turbine, the rotational energy of the rotor is transferred to the generator directly without the use of a gearbox. In a direct driven wind turbine the rotor of the wind turbine is directly connected to the rotor of the electrical generator. The chain of mechanically connected parts leading from the rotor of the wind turbine to the rotor of the generator is called the drive train of the wind turbine.

To allow the rotational movement and to provide the necessary stability of the rotating parts, the drive train is mounted with at least one bearing. This bearing allows the drive to train to rotate. At the same time, it provides the necessary stability by supporting the radial and axial loads and the bending moments present in the drive train. WO 2011/003482 A2 describes a wind turbine main bearing realized to bear a shaft of a wind turbine. The bearing comprises a fluid bearing with a plurality of bearing pads. The document describes a bearing with a cylindrical bearing surface and a series of trust pads.

The plain bearing has to provide a large surface to withstand the forces present in the drive train. As a consequence, the pads used for the cylindrical bearing surface are very large, heavy and difficult to exchange.

SUMMARY

A rotor of the wind turbine is directly connected with a rotating drive train of the wind turbine; the rotating drive train is directly connected with a rotor of an electrical generator of the wind turbine. The rotating drive train is connected with a stationary part of the wind turbine via at least one bearing, which allows the rotation of the drive train in relation to the stationary part.

The at least one bearing is a plain bearing and the bearing is a tapered bearing, which comprises at least one conical shaped sliding surface.

The drive train of the wind turbine comprises those parts that transfer the energy from the source to the generator. This includes the hub with at least one rotor blade and the rotor of the generator. In some constructive solutions of wind turbines, the drive train includes a shaft.

The stationary part of the wind turbine comprises the stator of the generator, the connection between the generator and the support structure, prepared to carry the aggregates of the nacelle of the wind turbine, and the connection to the tower of the wind turbine.

A plain bearing is a bearing without rolling elements, like balls or rollers. A plain bearing is also known as a sliding bearing, a friction bearing or a floating bearing.

The tapered bearing is capable to transfer axial and radial loads present in the drive train of the wind turbine; this can be done with one sliding surface. Thus, only one sliding surface is needed to transfer axial and radial loads from the drive train to the stationary part of the wind turbine. Thus, the sliding surface and the amount of material used are minimized. Thus, the bearing is cheaper to manufacture and less heavy.

In at least one configuration, the bearing comprises a first conical shaped sliding surface and a second conical shaped sliding surface which are reversely sloped in the axial direction of the plain bearing. A bearing constructed according to this configuration presents a v-shaped structure of the sliding surfaces when the bearing is cut in the axial direction. A bearing with this configuration is capable to withstand the radial and axial forces and the bending moments present in the drive train. Thus, one plain bearing build as a tapered bearing is sufficient to withstand the forces and there is no need for an additional bearing.

In at least one configuration, the bearing connects as a first bearing the rotor and the stator of the wind turbine generator, and the first bearing is located at a first end of the generator in respect to the axis of rotation of the generator. The rotor and the stator of the generator are connected by a bearing to provide a mainly constant air gap between the rotor and the stator. The drive train is connected via a bearing to the stationary part of the wind turbine. For both purposes, one bearing can be used that supports the drive train of the wind turbine and the rotor of the generator, and connect them to the stationary part of the wind turbine. Thus, the wind turbine comprises only one main bearing. Thus, this one bearing connects the whole drive train to the stationary part of the wind turbine. Thus, only one bearing is needed and maintenance only has to be performed at one bearing. Thus, the maintenance is faster and cheaper. Also, less material is used for one bearing as for separate bearings. Thus, the wind turbine is cheaper and less heavy. The first end of the generator can be the end of the generator pointing towards the hub of the wind turbine.

In another construction, a second bearing is arranged at a second end of the generator in respect to the axis of rotation of the generator. A second bearing is arranged at the end opposite to the first end of the generator. This second bearing stabilizes the connection between the rotor and the stator of the generator. Thus, the air gap between the rotor and the stator of the generator is even more constant. In addition, the second bearing supports the loads in the drive train. Thus, the loads on the first bearing are reduced due to the support of the second bearing. Especially, the bending moments are supported by a combination of a first and a second bearing that are spaced in an axial direction along the axis of rotation of a direct driven wind turbine.

In at least one embodiment, the second bearing comprises a cylindrical bearing surface, which is prepared to support radial loads and bending moments of the drive train. Thus, the second bearing can support the drive train due to transferring the radial loads and the bending moments from the drive train to the stationary part of the wind turbine.

In at least one embodiment, the bearing comprises a segmented sliding-surface. The segments of the sliding-surface are arranged at a rotating part of the bearing, which is connected to the rotating drive train of the wind turbine, or the segments are arranged at a stationary part of the bearing, which is connected to the stationary part of the wind turbine. The sliding surface of the bearing is segmented into at least two parts. The segments can be arranged along the direction of the rotation of the bearing. The sliding surface can be divided into pads arranged to build the sliding surface. Thus, the sliding surface is divided into smaller segments, which can be mounted and exchanged separately.

Thus, the mounting of the bearing is easier and also the exchange of the sliding surface is easier.

In at least one embodiment, the segments are arranged and connected within the plain bearing in a way that the exchange of an individual segment is permitted. Thus, a segment of the sliding surface can be exchanged without the need to exchange the complete sliding surface of the bearing. Thus, just those segments that are worn are exchanged while those parts, that are still good enough, stay in the bearing. Thus, material and maintenance time is saved. Thus, the parts that are exchanged are smaller than the complete sliding surface. Thus, the exchange of parts of the sliding surface can be done during maintenance without the use of heavy machinery. Thus, the maintenance is cheaper and faster.

The segments of the sliding surface are small enough, so that they can be handled within the wind turbine. Thus, the exchange can be performed from within the wind turbine and the wind turbine doesn't have to be dismantled. Thus, the exchange does not depend on the weather conditions at the side of the wind turbine. This is especially advantageous when the wind turbine is an offshore wind turbine.

In at least one embodiment, the segment comprises at least one tipping pad, while the surface of the tipping pad is capable to be aligned to the bearing surface of the counter side of the bearing. A tipping pad is a pad capable to tilt its surface in a way that the sliding surface aligns to the bearing surface of the counter side of the bearing. A tipping pad can be a tilting pad or a flexure pad for example. Thus, the pad can tilt and the surface of the tipping pad arranges itself to the counter side of the bearing. Thus, the forces acting on the bearing act equally distributed on the sliding surface. Thus, the wear and tear on the sliding surface is equally distributed. Thus, the lifetime of the segments is improved and the risks of damages in the bearing, which are caused by uneven wear and tear, are reduced.

In at least one embodiment, the bearing is a hydrodynamic bearing, where a lubrication film at the sliding surface is maintained by the rotating bearing parts. Thus, the lubrication film is maintained during the rotation of the bearing. Thus, the lubrication of the bearing surface is independent of additional aggregates, like pumps. Thus the risk of damage due to insufficient lubrication is minimized. Thus, the performance of the wind turbine is increased.

In at least one embodiment, the bearing is a hydrostatic bearing, where a lubrication film at the sliding surface is maintained by an applied pressure of an external pump. Thus, the lubrication is ensured independently of the rotation of the drive train. Thus, the lubrications is also ensured when the wind turbine is stopping or starting rotation. Thus, the lubrication is also sufficient in a low wind situation or in a situation when the wind is changing in speed and the wind turbine might stop and start repeatedly.

In at least one embodiment, the bearing is a hybrid bearing, where a lubrication film at the sliding surface is maintained by a combination of an applied pressure of an external pump and by rotating bearing parts. The pump is only needed when the wind turbine is starting or stopping rotation and the lubrication film cannot be ensured just by the rotation of the drive train. Thus, the lubrication is maintained independently of the rotation of the drive train. In addition, the energy used to operate the pump can be saved when rotation of the drive train is maintaining the lubrication film and the pump are not needed.

In at least one embodiment, the sliding surface of the plain bearing comprises a groove and/or a pocket, being used as inlet or outlet for lubrication purposes of the plain bearing.

The lubrication can be distributed more equally by the help of grooves or pockets in the sliding surface. Thus, the lubrication is more equally distributed. Thus, the risk of insufficient lubrication and the risk of damage in the bearing are reduced. Thus, the lifetime of the bearing can be enhanced and the energy production of the wind turbine can be increased.

BRIEF DESCRIPTION

Figure 2:
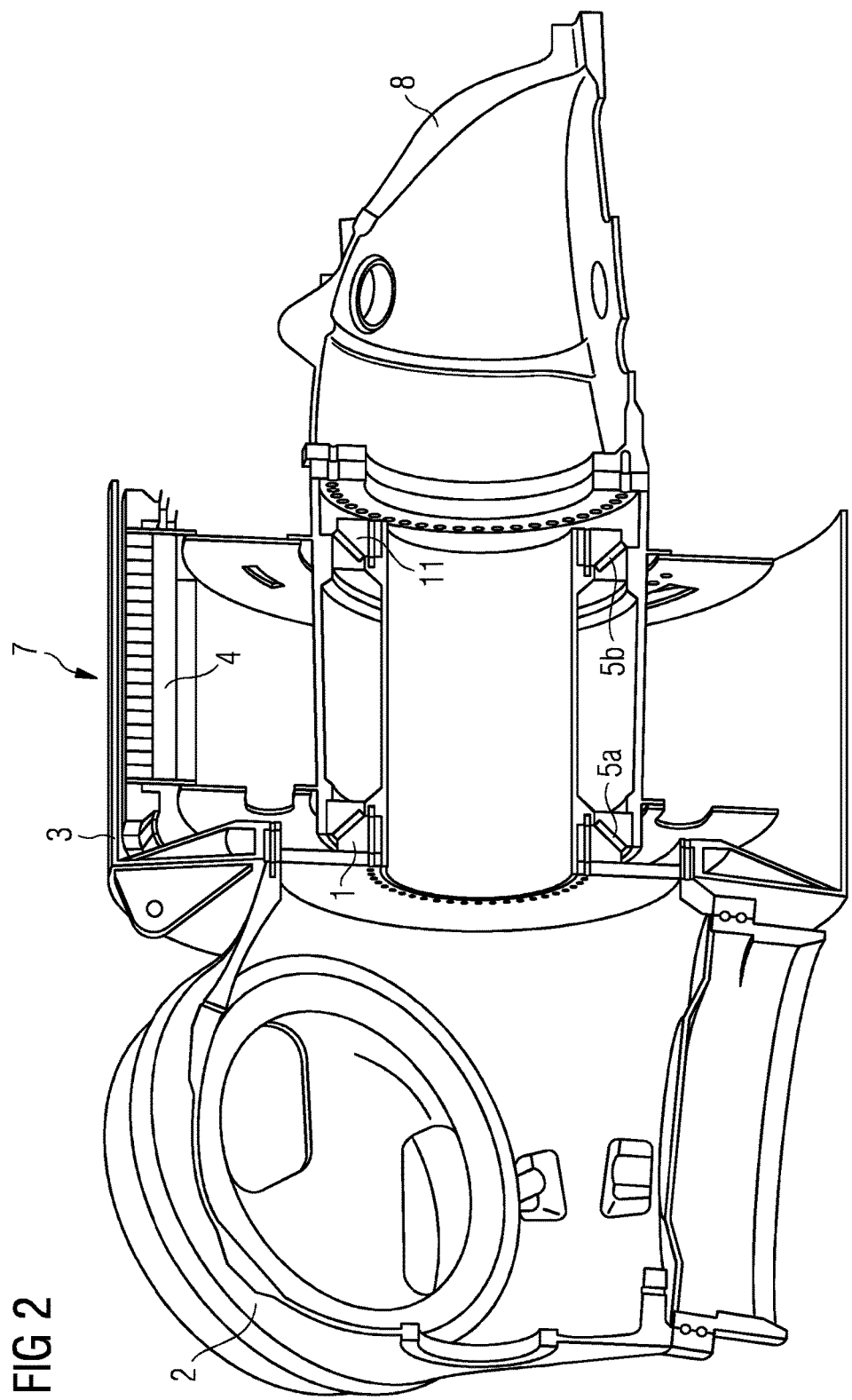
Figure 3:
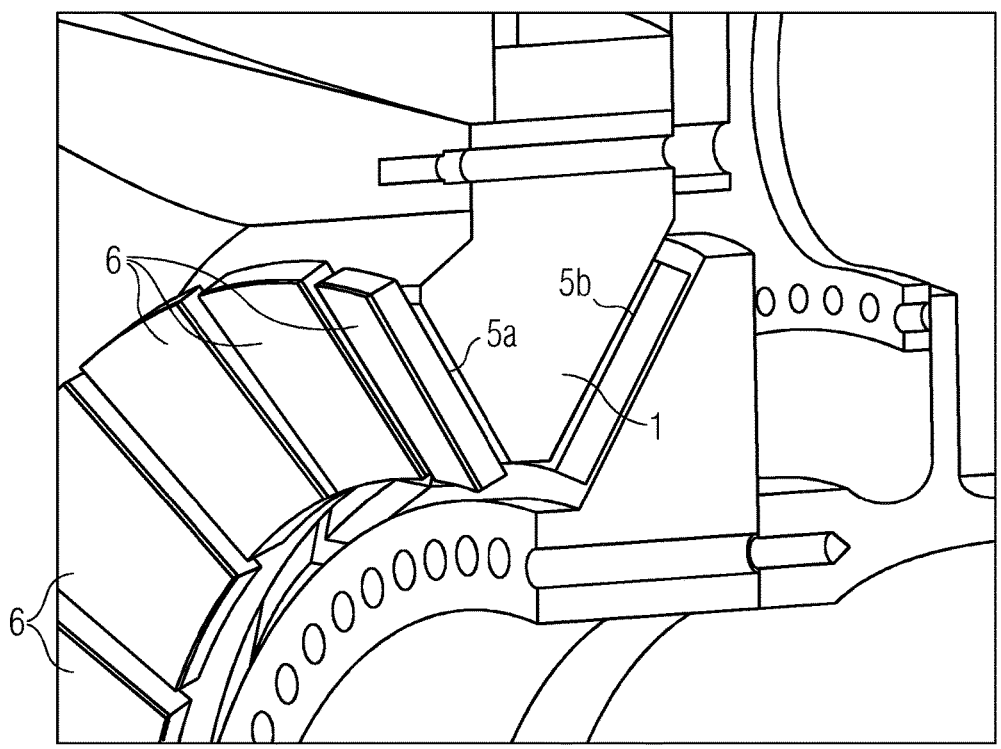
Figure 4:
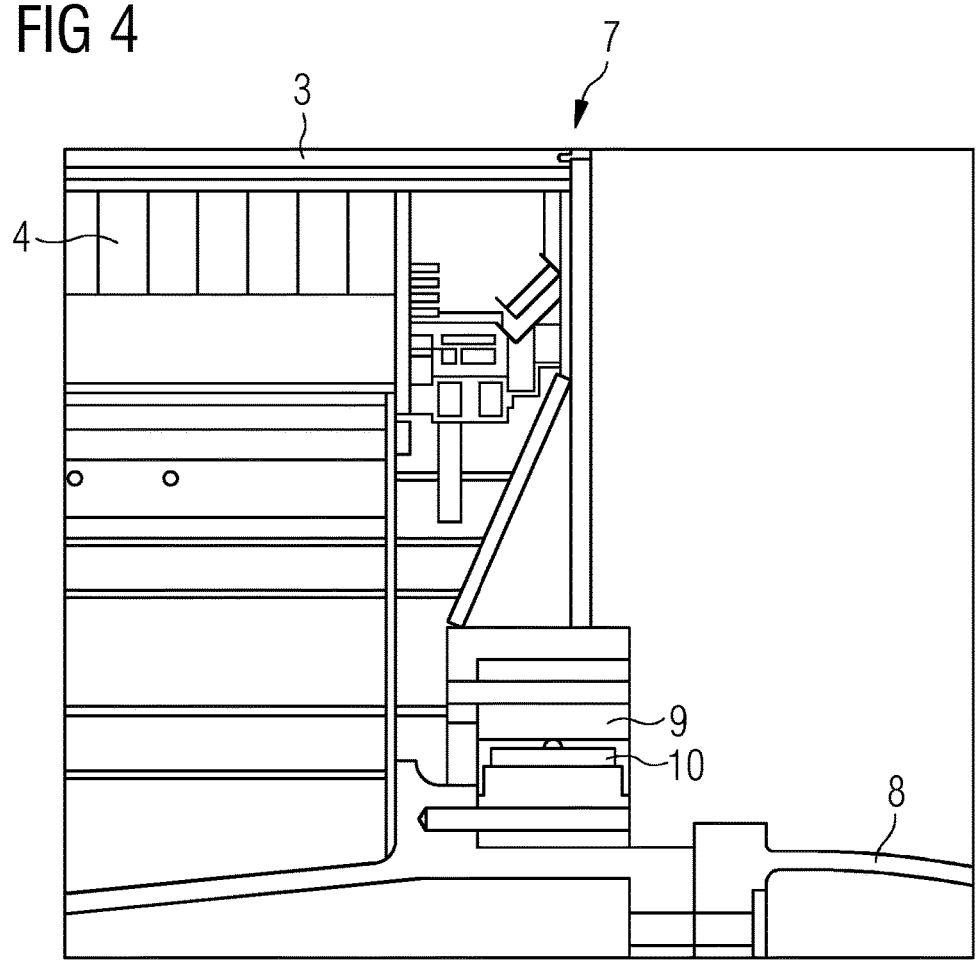

The figures show at least one embodiment and do not limit the scope of the invention, wherein:
FIG. 1 shows a wind turbine with a plain bearing;
FIG. 2 shows a second configuration of the plain bearing;
FIG. 3 shows a detail of a configuration; and
FIG. 4 shows a detail of a bearing.

DETAILED DESCRIPTION

FIG. 1 shows a wind turbine with a plain bearing. FIG. 1 shows a longitudinal cut through the hub 2, the plain bearing 1, and the electrical generator 7 of a direct driven wind turbine. The longitudinal cut is going along the axis of rotation of the electrical generator 7 of the wind turbine. The hub 2 is connected to the rotor 3 of the generator and to the rotating side of the bearing 1. The stator 4 of the generator 7 is connected to the stationary side of the plain bearing 1.

The plain bearing 1 is located between the hub 2 of the wind turbine and the electrical generator 7 of the wind turbine. So it is connected with the stationary side to the hub-sided end of the stator 4 of the generator 7 and with the rotating side to the hub 2 of the wind turbine. The plain bearing 1 is a tapered bearing. The cut through the bearing shows a V-shaped arrangement of two sliding surfaces 5a and 5b, which are tilted and arranged in a way that they are reversely sloped in axial direction with respect to the axis of rotation of the electrical generator 7.

The bearing surface 5a, 5b is equipped with segments 6 that are connected in the bearing to build the sliding surface 5a, 5b. The segments 6 can be tilting pads. The surface of the tilting pads is capable to, or configured to, be aligned to the bearing surface 5a, 5b of the counter side of the bearing 1, which is sliding along the pads when the bearing 1 is rotating.

The plain bearing 1 connects the rotating drive train of the wind turbine with the stationary part of the wind turbine in a rotatable manner. The rotating drive train comprises the hub 2 of the wind turbine that is connected to the rotor 3 of the electrical generator 7. The stationary part of the wind turbine comprises the stator 4 of the electrical generator 7. The bearing connects the rotating drive train of the wind turbine and the rotor 3 of the electrical generator 7 with the stator 4 of the electrical generator 7.

The plain bearing 1 is constructed to bear the radial and axial forces and the bending moments present in the drive train. In this example, there is only one bearing 1, with two sliding surfaces 5a and 5b, that connects the rotating drive train of the wind turbine with the stationary part of the wind turbine.

FIG. 2 shows a second configuration of the plain bearing. FIG. 2 shows a cut along the axis of rotation of the electrical generator 7. The cut shows the hub 2 of the wind turbine, the rotor 3 and the stator 4 of the electrical generator 7, the plain bearing 1 and a load bearing structure 8 that connects the stationary part of the wind turbine to the tower.

The plain bearing 1 is a tapered bearing, and shows a tilted sliding surface 5a. The first plain bearing 1 is combined with a second bearing 11. The second bearing 11 is a plain bearing that is located at the second end of the electrical generator 7. The second end of the electrical generator 7 is the end opposite the end where the first bearing 1 is located. Opposite ends of the electrical generator 7 are seen with respect to the axis of rotation of the generator. The second bearing 11 is a tapered bearing with a tilted bearing surface 5b. In this case, the bearing surfaces 5a of the first bearing 1 and the sliding surface 5b of the second bearing 11 are reversely sloped in axial direction in respect to the axis of rotation of the generator. The second bearing 11 can also be a plain bearing with a cylindrical bearing surface. The first plain bearing 1 and the second plain bearing 11 are constructed to bear the radial and axial forces and the bending moments present in the drive train of the wind turbine.

FIG. 3 shows a detail of a configuration. FIG. 3 shows an axial cut through the plain bearing 1 in the wind turbine. The plain bearing 1 is a tapered bearing and comprises two sliding surfaces 5a and 5b. The sliding surfaces 5a, 5b are equipped with segments 6 that are connected within the bearing to provide the sliding surfaces 5a, 5b. The segments 6 can be attached to the stationary side of the bearing or to the rotating side of the bearing. The segments 6 can be tilting pads, which have a surface that is capable to be aligned to the bearing surface 5a, 5b of the counter side of the bearing 1, which is sliding along the pads when the bearing 1 is rotating. The segments of the sliding surface 5a, 5b of the plain bearing 1 are connected in a way that they can be exchanged individually without the need to exchange the whole bearing or the whole sliding surface.

FIG. 4 shows a detail of a plain bearing. FIG. 4 shows a cut along the axis of rotation through the second bearing 9. The second bearing 9 is arranged at the end of the electrical generator 7 that is opposite of the end where the first plain bearing is located. The second bearing 9 is located between the rotor 3 and the stator 4 of the electrical generator 7. The stator 4 is connected to the stationary part of the wind turbine. The stator 4 of the electrical generator 7 and the stationary part of the wind turbine are connected to the load bearing structure 8 that connects the stationary part of the wind turbine to the tower.

In this configuration, the second bearing 9 is a plain bearing with a sliding surface 10. The sliding surface can be equipped with segments that are arranged and connected to build the sliding surface 10 of the second bearing 9. The segments can be connected to the rotating part of the second bearing 9 or to the stationary part of the second bearing 9. The segment can also be tilting pads that comprise a sliding surface 10 that is capable to, or configured to, be aligned to the bearing surface of the counter side of the bearing 9, which is sliding along the pads when the bearing 1 is rotating.

In this configuration, the second bearing 9 shows a cylindrical bearing surface. A cylindrical bearing surface 10 is combined with a tapered bearing as a first bearing at the opposite side of the electrical generator 7. The first bearing and the second bearing 9 are constructed in a way to bear the radial and axial forces and the bending moments present in the drive train of the wind turbine.

The invention claimed is:
1. A direct-drive wind turbine comprising:
a rotating drive train of the wind turbine;
a rotor of an electrical generator of the wind turbine, the rotor of the electrical generator being directly connected to the rotating drive train; and
a stationary part of the wind turbine, the stationary part being connected to the rotating drive train via at least one bearing, which allows a rotation of the rotating drive train in relation to the stationary part, the at least one bearing being positioned between a hub of the wind turbine and the stationary part;
wherein the at least one bearing is a plain bearing,
wherein the plain bearing is a tapered bearing, which comprises at least one conical shaped sliding surface;
wherein a second bearing is arranged at a second end of the electrical generator with respect to an axis of rotation of the electrical generator.

2. The direct-drive wind turbine according to claim 1, wherein the at least one bearing comprises a first conical shaped sliding surface and a second conical shaped sliding surface which are reversely sloped in an axial direction of the at least one bearing.

3. The direct-drive wind turbine according to claim 1, wherein the at least one bearing connects as a first bearing the rotor and the stator of the wind turbine generator and where the first bearing is located at a first end of the electrical generator with respect to an axis of rotation of the electrical generator.

4. The direct-drive wind turbine according to claim 1, wherein the second bearing comprises a cylindrical bearing surface, which is prepared to support radial loads and bending moments of the rotating drive train.

5. The direct-drive wind turbine according to claim 1, wherein the at least one bearing comprises a segmented sliding-surface, and at least one of:
wherein a plurality of segments of the segmented sliding-surface are arranged at a rotating part of the at least one bearing, which is connected to the rotating drive train of the wind turbine, and
wherein the plurality of segments are arranged at a stationary part of the at least one bearing, which is connected to the stationary part of the wind turbine.

6. The direct-drive wind turbine according to claim 5, wherein the plurality of segments are arranged and connected within the at least one bearing in a way that an exchange of an individual segment is permitted.

7. The direct-drive wind turbine according to claim 5, wherein each of the plurality of segments comprises at least one tipping pad, while a surface of the tipping pad is capable to be aligned to a bearing surface of a counter side of the at least one bearing.

8. The direct-drive wind turbine according to claim 1, wherein the at least one bearing is a hydrodynamic bearing, where a lubrication film at the sliding surface is maintained by the rotating bearing parts.

9. The direct-drive wind turbine according to claim 1, wherein the at least one bearing is a hydrostatic bearing, where a lubrication film at the sliding surface is maintained by an applied pressure of an external pump of the wind turbine.

10. The direct-drive wind turbine according to claim 1, wherein the at least one bearing is a hybrid bearing, where a lubrication film at the sliding surface is maintained by a combination of an applied pressure of an external pump and by rotating bearing parts.

11. The direct-drive wind turbine according to claim 1, wherein a segmented sliding surface of the at least one bearing comprises a groove and/or a pocket, being used as an inlet or an outlet for lubrication purposes of the at least one bearing.

\* \* \* \* \*